US006682106B2

(12) United States Patent
Parker

(10) Patent No.: US 6,682,106 B2
(45) Date of Patent: Jan. 27, 2004

(54) NON-ROTATING QUICK CONNECTOR FOR LAWN SPRINKLERS

(75) Inventor: Robert L. Parker, West Valley City, UT (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 0 days.

(21) Appl. No.: 09/963,213

(22) Filed: Sep. 25, 2001

(65) Prior Publication Data

US 2002/0036406 A1 Mar. 28, 2002

Related U.S. Application Data

(60) Provisional application No. 60/235,102, filed on Sep. 25, 2000.

(51) Int. Cl.[7] .............................................. F16L 27/00
(52) U.S. Cl. ...................... 285/282; 285/277; 285/317; 285/316; 285/318
(58) Field of Search ................... 285/282, 276, 285/277, 317, 316, 318

(56) References Cited

U.S. PATENT DOCUMENTS

| 172,024 | A | * | 1/1876 | Hug ........................... 239/251 |
| 935,071 | A | * | 9/1909 | Vossler ........................ 285/280 |
| 1,571,950 | A | * | 2/1926 | Humphrey ................... 239/247 |
| 1,873,914 | A | * | 8/1932 | Adams ........................ 285/277 |
| 2,476,172 | A | * | 7/1949 | Williams ..................... 285/282 |
| 2,599,280 | A | * | 6/1952 | Phillips ....................... 285/276 |
| 2,819,914 | A | * | 1/1958 | Eitner ......................... 285/277 |
| 2,935,338 | A | * | 5/1960 | Mills, Jr. .................... 285/277 |
| 3,280,526 | A | * | 10/1966 | Pepitone .................... 285/317 |
| 3,351,362 | A | * | 11/1967 | Hansen ....................... 285/277 |
| 4,139,222 | A | * | 2/1979 | Loland ................... 285/316 X |

* cited by examiner

Primary Examiner—David Bochna
(74) Attorney, Agent, or Firm—Mallinckrodt & Mallinckrodt; Robert R. Mallinckrodt

(57) ABSTRACT

A quick connect and disconnect coupling which does not allow free rotation of the ends of the coupling with respect to one another includes a male connector having a coupling end and a female connector having a coupling end with a receiving opening therein to receive the coupling end of the male connector when the connectors are in coupled condition. A holding mechanism is associated with the connectors to hold them together in coupled condition and allow easy disconnection when desired. Interengaging cooperable surfaces are provided on the male and female connectors, such as tabs extending from the female connector to engage a flat or other tab mating surface on the male connector to substantially prevent relative rotation of the male connector in relation to the female connector. The coupling is particularly useful for attaching sprinkler heads to sprinkler head holding bases in sprinkler systems to allow easy replacement of the sprinkler heads.

16 Claims, 3 Drawing Sheets

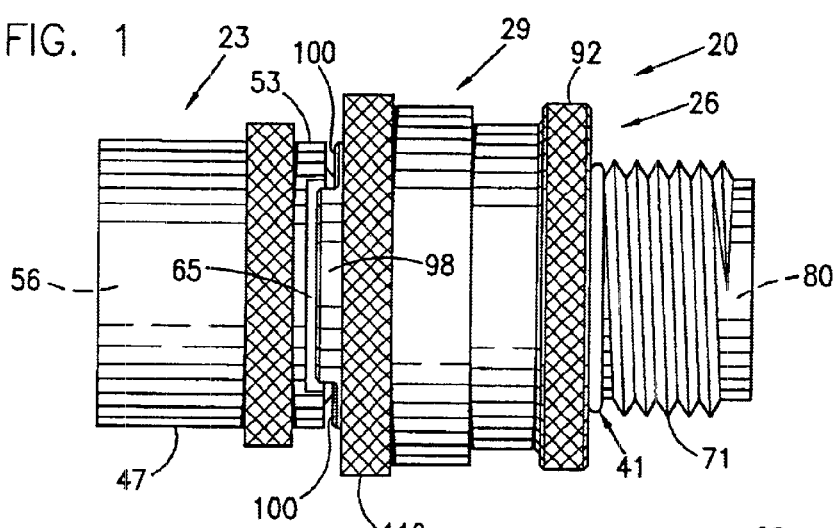
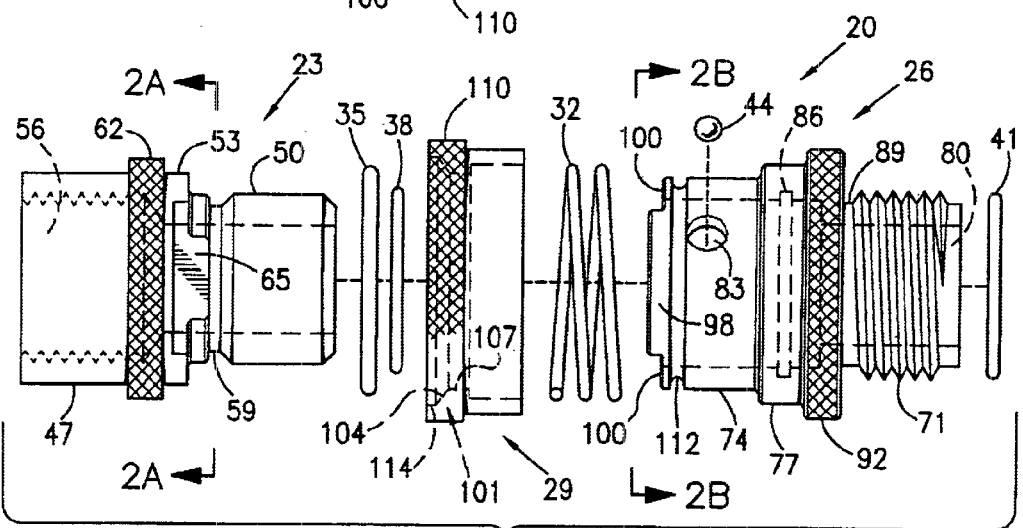
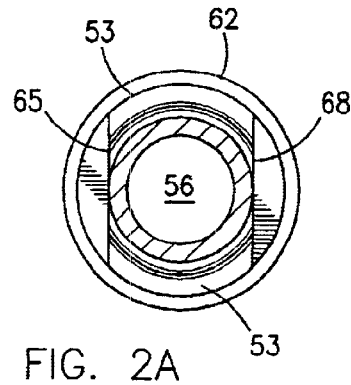
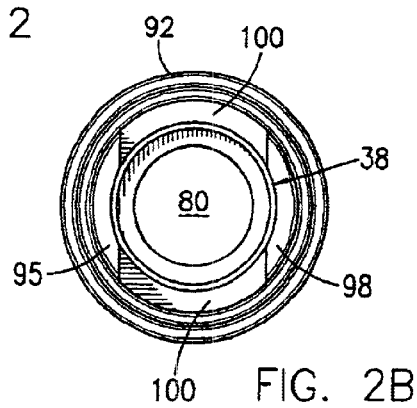
FIG. 1
FIG. 2
FIG. 2A
FIG. 2B

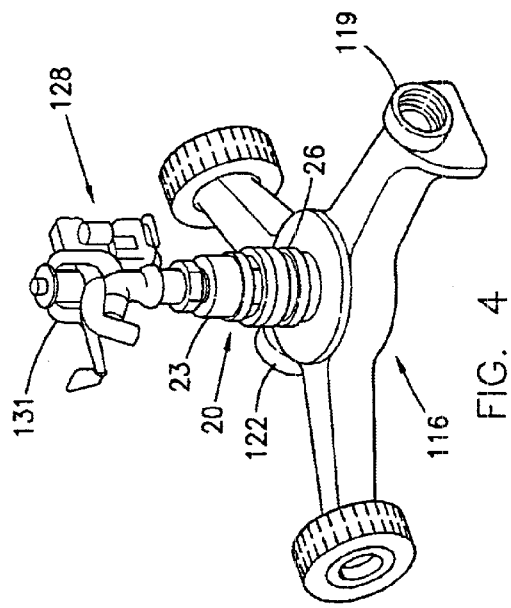
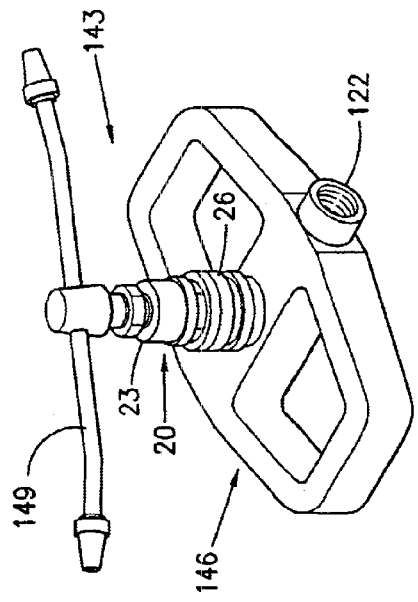
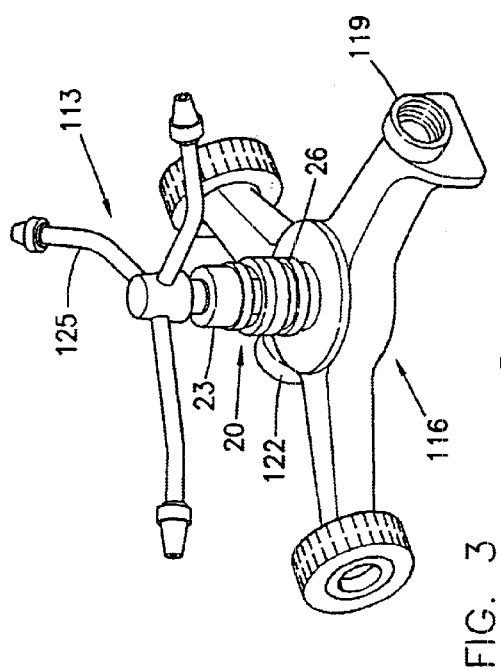
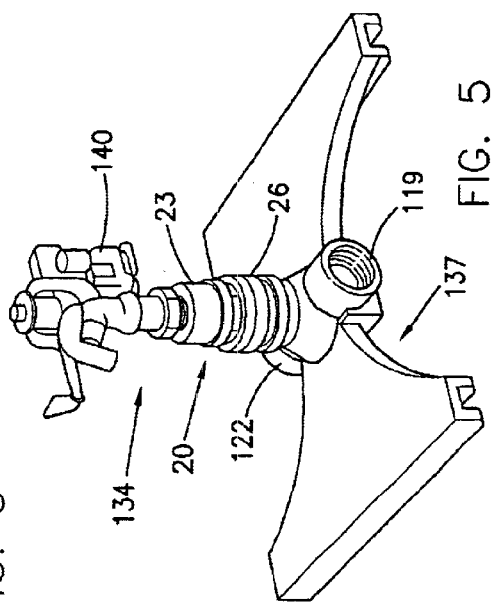

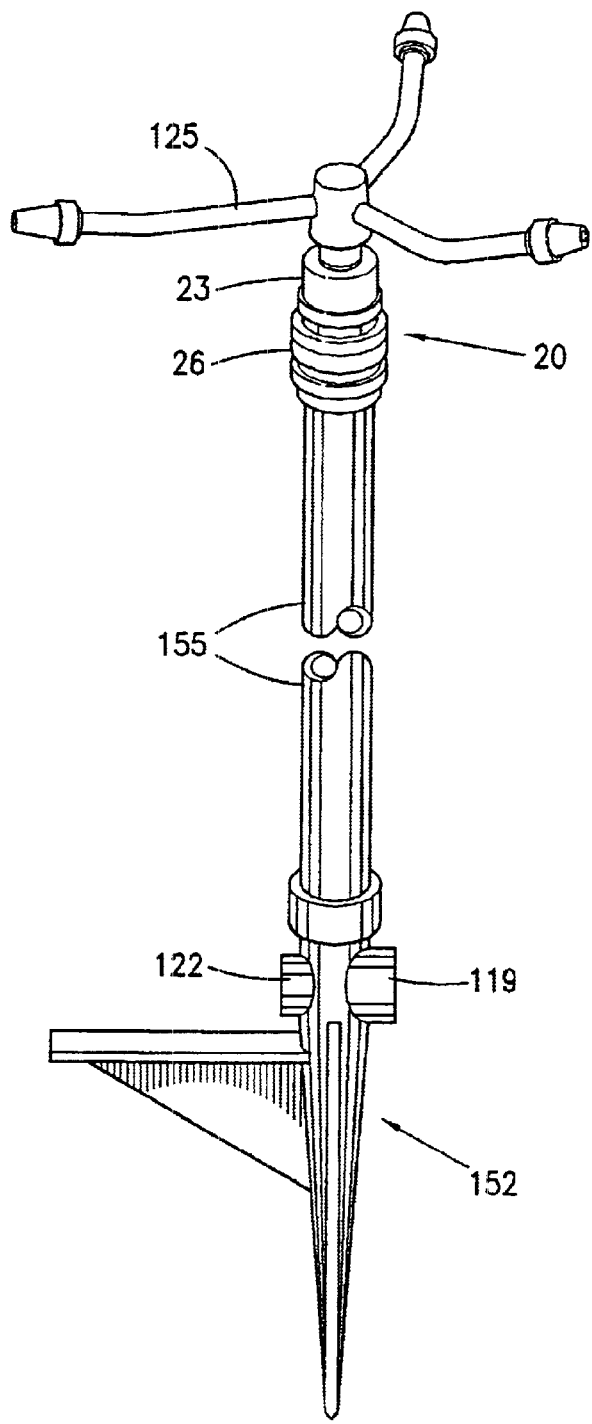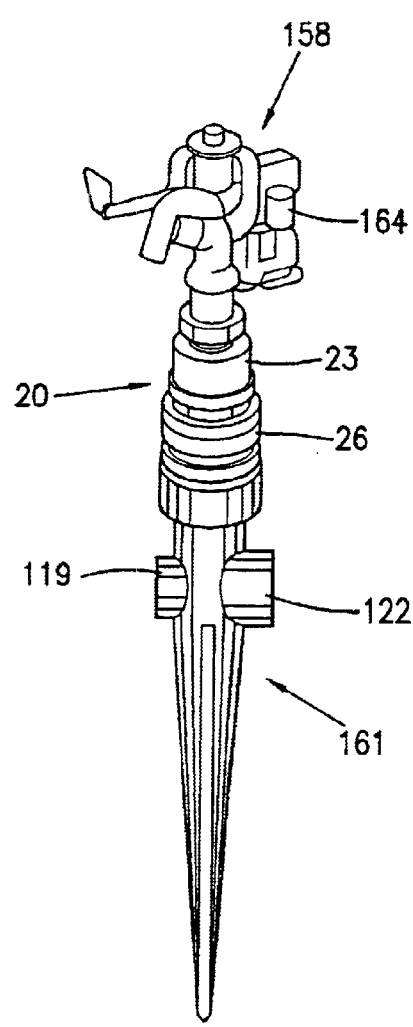
FIG. 7
FIG. 8

NON-ROTATING QUICK CONNECTOR FOR LAWN SPRINKLERS

RELATED APPLICATION

This application claims priority of my copending U.S. Provisional Patent Application No. 60/235,102 filed Sep. 25, 2000.

SPECIFICATION

BACKGROUND OF THE INVENTION

1. Field

The invention is in the field of quick connect couplers.

2. State of the Art

Quick connect couplers are well known and commonly used in connecting air powered tools to compressed air lines. Quick connect couplers allow a user to merely push two portions of the coupler together to connect a fluid line. To disconnect the fluid line, the user merely easily moves a sleeve against its bias and the two portions separate. The prior art construction of such couplers allow unrestricted rotational movement of one portion of the coupler with respect to the other portion of the coupler.

Quick connect couplers are not known to be used in water delivery systems, such as sprinkler systems. A problem with the use of such couplers in a sprinkler system using rotating sprinkler heads, such as impact heads, is that the base of such heads have to be held against rotation so that the sprinkler head will rotate as desired. If the coupler, and thus the base of the sprinkler head, is free to rotate, the sprinkler, rather than rotating, may merely stay in substantially one position with the sprinkler head base moving back and forth. If a non-rotating sprinkler head is used, the positioning of the spray may easily rotate out of position if the base is free to rotate.

There are some above ground sprinkler systems wherein sprinklers heads, such as impact heads, are mounted on portable bases by screwing such heads into the base. One or more bases are connected together by hoses, and the bases are moved and arranged to water an area needing water. If a sprinkler on a base is to be changed, it is necessary to get a wrench and unscrew the sprinkler head from the base and then screw the replacement sprinkler head into the base. This is time consuming and requires that the user have the necessary tools available.

SUMMARY OF THE INVENTION

The invention comprises a quick connect and disconnect coupling which includes respective male and female connectors having respective interlocking portions which prevent relative rotation therebetween in the coupled condition. The coupling is particularly useful for applications wherein free rotation of the ends of the coupler is undesirable such as for connecting rotary lawn sprinklers to a supporting base.

The quick connect and disconnect coupling includes a male connector having a coupling end and an attachment end and a female connector having a coupling end with a receiving opening to receive the coupling end of the male connector therein when the connectors are in coupled condition, and an attachment end. A holding mechanism is associated with and cooperable between the male connector and the female connector to secure the coupling end of the male connector in the receiving opening of the coupling end of the female connector when the coupling end of the male connector is inserted into the receiving opening and to release the coupling end of the male connector from the receiving opening when desired to disconnect the male connector from the female connector. Interengaging cooperable surfaces on the male connector and the female connector interlock to prevent relative rotation of the male connector and female connector when the connectors are in coupled condition. Such interlocking or interengaging surfaces may take the form of one or more tabs extending from the coupling end of the female connector to mate with flats or other receiving surfaces of the male connector.

The holding mechanism may include at least one ball retaining hole through the coupling end of the female connector with a ball positioned in the at least one ball retaining hole. A sleeve having a first inside diameter portion and a tapered portion tapering from the first diameter portion to a larger diameter portion is slidably mounted on the coupling end of the female connector over the at least one ball retaining hole so that the first diameter portion or the tapered portion may be selectively aligned with the at least one ball retaining hole. When the first diameter portion is aligned with the at least one ball retaining hole it holds the ball in the at least one ball retaining hole in an inward position wherein the ball extends into the receiving opening. When the tapered portion larger diameter portion when is aligned over the at least one ball retaining hole it allows the ball in the at least one ball retaining hole to move to an outward position out of the receiving opening. A spring biases the sleeve to a biased position wherein the first diameter portion is aligned with the at least one ball retaining hole. A ball receiving recess in the coupling end of the male connector, such as an annular groove in the coupling end, receives the ball in the at least one ball retaining hole when the coupling end of the male connector is received in the receiving opening of the female connector. The male and female connectors are held together by holding the ball in the at least one ball retaining hole in inward position to extend into the ball receiving recess.

THE DRAWINGS

The best mode presently contemplated for carrying out the invention is illustrated in the accompanying drawings, in which:

FIG. 1 is a side elevational view of the non-rotating quick connector of the invention;

FIG. 2, an exploded side elevational view corresponding to FIG. 1 showing the individual components thereof;

FIG. 2a, lateral vertical sectional view taken on the line 2a—2a of FIG. 2 showing the anti-rotation flats on the male connector;

FIG. 2b, a lateral vertical sectional view taken on the line 2b—2b of FIG. 2 showing the anti-rotation tabs on the female connector;

FIG. 3, a perspective view of a lawn sprinkler utilizing the quick connector to attach a three arm rotary spray head to a wheeled base;

FIG. 4, a perspective view of a lawn sprinkler utilizing the quick connector to attach an impact spray head to such wheeled base;

FIG. 5, a perspective view of a lawn sprinkler utilizing the quick connector to attach an impact spray head to a non-wheeled base;

FIG. 6, a perspective view of a lawn sprinkler utilizing the quick connector to attach a two arm rotary spray head to a non-wheeled base;

FIG. 7, a perspective view of a staked lawn sprinkler utilizing the quick connector to attach a three arm rotary spray head on an extension arm to a stake; and FIG. 8, a perspective view of a staked lawn sprinkler utilizing the quick connector to attach an impact spray head to a stake.

DETAILED DESCRIPTION OF THE ILLUSTRATED EMBODIMENTS

Referring to FIGS. 1 and 2, the non-rotating quick connector 20 comprises a male connector 23, a female connector 26, a tubular sleeve 29, a compression spring 32, a lock ring 35, a pair of O-rings 38 and 41, and a plurality of retaining balls 44.

Male connector 23 includes an internally threaded portion 47 forming an attachment end integrally connected to a male quick connect or coupling portion or end 50 by means of a stepped shoulder portion 53 intermediate the length of the connector 23. Male connector 23 further includes a water channel 56 which extends completely through male connector 23, an external annular retaining ball groove 59 about coupling portion 50, an annular knurled gripping surface 62, and a pair of anti-rotation flats 65 and 68 on shoulder portion 53. Male connector 23 is preferably made of brass.

Female connector 26 comprises an externally threaded portion 71 forming an attachment end integrally connected to a female quick connect portion or end 74 by means of a stepped shoulder portion 77. Female connector 26 further includes a water channel 80 which extends completely through female connector 26, a plurality of tapered ball retaining holes 83 through female portion 74, an internal annular O-ring groove 86 inside shoulder portion 77, an external annular O-ring groove 89 about externally threaded portion 71 adjacent shoulder portion 77, an annular knurled gripping surface 92 about shoulder portion 77, and a pair of anti-rotation tabs 95 and 98 formed in female portion 74 by a notch 100 therein. Female connector 26 is preferably made of brass.

Sleeve 29 includes an annular internal shoulder 101 having an annular tapered portion 104 and an annular flat portion 107, and an annular knurled gripping surface 110. Sleeve 29 is preferably made of brass. Lock ring 35 is secured in annular lock ring groove 112 during assembly after sleeve 29 is slid over female coupling portion 74 with balls 44 in holes 83.

Compression spring 32 biases sleeve 29 against lock ring 35 and comprises a piece of wire wound about two turns at such a radius as to closely fit about female portion 74 of female connector 26. Spring 29 is preferably made of stainless steel.

Lock ring 35, O-rings 38 and 41, and retaining balls 44 are of standard construction known in the fluid flow industry, as is the construction of ball retaining holes 83 to retain balls 44 therein.

Female connector 26, sleeve 29, compression spring 32, lock ring 35, O-rings 38 and 41, and retaining balls 44 fit together as show in FIGS. 1 and 2. Spring 32 is disposed about female coupling portion 74 of female connector 26 with sleeve 29 disposed thereabout, retaining balls 44 being retained within respective tapered ball retaining holes 83 by internal shoulder 101 of sleeve 29. Sleeve 29 is retained to female connector 26 by means of lock ring 35 secured in annular lock ring groove 112 about female portion 74 which abuts internal shoulder 101 of sleeve 29 as sleeve 29 is biased by spring 32 to a forward, or locking position. When in locking position, retaining balls 44 are retained in an inwardly-biased position by contact with annular flat portion 107 of sleeve 29 so as to partially extend into water channel 80. When sleeve 29 is forced by hand against the bias of spring 32 to a rearward position, balls 44 are disposed adjacent annular tapered portion 104 or larger diameter annular portion 114 of sleeve 29 which permits balls 44 to move radially outwardly so as to be removed from inside water channel 80. O-rings 38 and 41 are disposed within respective O-ring grooves 86 and 89.

Male and female connectors 23 and 26 removably couple together by forcing sleeve 29 to the rearward position against the bias of spring 32 such that retaining balls 44 can clear water channel 80 when male coupling portion 50, which fits closely therewithin, is moved thereinto. When male and female connectors 23 and 26 are rotated relative to one another to the proper position, anti-rotation tabs 95 and 98 in female portion 74 fit against anti-rotation flats 65 and 68 on shoulder portion 53 with notch 100 in female portion 74 providing clearance over shoulder portion 53 of male connector 23. Male coupling portion 50 is moved into the opening in female coupling portion 74 so that groove 59 is aligned with ball receiving holes 83 and balls 44 therein so that balls 44 can extend into groove 59. Sleeve 29 is then released so as to be biased back to the forward position by spring 32 such that annular flat portion 107 thereof holds retaining balls 44 in ball retaining groove 78 of male connector 23. In such a coupled condition, male and female connectors 23 and 26 are locked together both longitudinally and rotationally, with O-rings 38 and 41 sealing therebetween. The procedure is reversed to uncouple male and female connectors 23 and 26, without the step of rotating since anti-rotation tabs 95 and 98 in female portion 74 already are aligned to fit against anti-rotation flats 65 and 68 on shoulder portion 53 of male connector 23.

FIGS. 3–8 show a plurality of applications for quick connector 20. In FIG. 3 is shown a rotary lawn sprinkler 113 comprising a wheeled base 116 with respective male and female hose couplings 119 and 122 for connection to standard garden hoses (not shown), a three arm rotary sprayer or sprinkler head 125, and quick coupling 20. One of male and female connectors 23 and 26 is threadably connected to base 116 and the other to sprayer 125 such that sprayer 125 is quickly connectable and disconnectable to base 116 without male and female connectors 23 and 26 rotating relative to one another during operation of sprinkler 113. This is important, because the rotation of sprayer 125 can induce relative rotation of male and female connectors 23 and 26 without such anti-rotation feature, causing less efficient watering efficiency, and premature failure of the O-rings.

In FIG. 4 is shown a rotary lawn sprinkler 128 comprising wheeled base 116, a rotary impact sprayer or sprinkler head 131, and quick coupling 20. Sprinkler 113 can be configured to be sprinkler 128 simply by uncoupling male and female connectors 23 and 26 of quick coupling 20 and interchanging sprayer 131 with sprayer 125, each having a respective male or female connector 23 and 26.

In FIG. 5 is shown a rotary lawn sprinkler 134 comprising a non-wheeled base 137 with respective male and female hose couplings 119 and 122, a rotary impact sprayer 140, and quick coupling 20. In FIG. 6 is shown a rotary lawn sprinkler 143 comprising a non-wheeled base 146 with a female hose couplings 122, a two arm rotary sprayer 149, and quick coupling 20. In FIG. 7 is shown a staked lawn sprinkler comprising a stake assembly 152 with respective male and female hose couplings 119 and 122, an extension tube 155, three arm rotary sprayer 125, and quick coupling 20. Tube 155 interconnects the respective male and female connectors 23 and 26 with rotary sprayer 125. In FIG. 8 is shown a staked lawn sprinkler 158 comprising a stake assembly 161 with respective male and female hose couplings 119 and 122, a rotary impact sprayer 164, and quick coupling 20.

While the illustrated embodiments show male or external threads on the attachment end of the female connector and female or internal threads on the attachment end of the male connector, either end could have either internal or external threads depending upon the particular application for the coupling. Further, the coupling can be used in various situation, not just the specific sprinkler uses shown.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A quick connect and disconnect coupling, comprising:

a male connector having a coupling end with a surface configured with at least one aligning portion thereof, and an attachment end adapted to be connected in fluid flow relationship to a fluid flow line;

a female connector having a coupling end with a receiving opening to receive the coupling end of the male connector therein and having a surface configured with at least one aligning portion to frilly receive the coupling end of the male connector therein in a coupling condition only when the at least one aligning portion of the surface of the male coupling end aligns with and interengages the at least one aligning portion of the surface of the female receiving opening, and an attachment end adapted to be connected in fluid flow relationship to a fluid flow line;

a holding mechanism associated with and cooperable between the male connector and the female connector to secure the coupling end of the male connector in the receiving opening of the coupling end of the female connector when the coupling end of the male connector is inserted into and fully received in coupling condition in the receiving opening and to release the coupling end of the male connector from the receiving opening when desired to disconnect the male connector from the female connector; and the interengaging aligning surface portions on the male connector and the female connector cooperating to prevent relative rotation of the male connector and female connector when the connectors are in coupling condition, as the connectors are joined and moved into coupling condition, and as the connectors are released and separated from coupling condition;

wherein the interengaging aligning surfaces include at least one flat formed on one of the male and female connectors and at least one tab formed on the other of the male and female connectors which engages the at least one flat when the connectors are in coupled condition.

2. A quick connect and disconnect coupling, comprising:

a male connector having a coupling end with a surface configured with at least one aligning portion thereof, and an attachment end adapted to be connected in fluid flow relationship to a fluid flow line;

a female connector having a coupling end with a receiving opening to receive the coupling end of the male connector therein and having a surface configured with at least one aligning portion to fully receive the coupling end of the male connector therein in a coupling condition only when the at least one aligning portion of the surface of the male coupling end aligns with and interengages the at least one aligning portion of the surface of the female receiving opening, and an attachment end adapted to be connected in fluid flow relationship to a fluid flow line;

a holding mechanism associated with and cooperable between the male connector and the female connector to secure the coupling end of the male connector in the receiving opening of the coupling end of the female connector when the coupling end of the male connector is inserted into and fully received in coupling condition in the receiving opening and to release the coupling end of the male connector from the receiving opening when desired to disconnect the male connector from the female connector;

the interengaging aligning surface portions on the male connector and the female connector cooperating to prevent relative rotation of the male connector and female connector when the connectors are in coupling condition, as the connectors are joined and moved into coupling condition, and as the connectors are released and separated from coupling condition; and wherein the interengaging aligning surfaces include at least one flat formed on the male connector and at least one tab formed on the female connector which engages the at least one flat when the connectors are in coupled condition.

3. A quick connect and disconnect coupling according to claim 2, wherein the male connector has a length and the at least one flat is intermediate the length.

4. A quick connect and disconnect coupling according to claim 3, wherein the coupling end of the male connector joins the attachment end of the male connector intermediate the length of the male connector and the at least one flat is adjacent the joining of the coupling and attachment ends.

5. A quick connect and disconnect coupling according to claim 4, wherein the at least one flat is a pair of flats and the at least one tab is a pair of tabs.

6. A quick connect and disconnect coupling according to claim 2, wherein the attachment ends of the connectors are threaded for attachment to water flow lines.

7. A quick connect and disconnect coupling according to claim 6, wherein the attachment ends of the connectors are threaded for attachment to water flow lines forming part of a sprinkler system.

8. A quick connect and disconnect coupling, comprising:

a male connector having a coupling end with a surface configured with at least one aligning portion thereof, and a threaded attachment end adapted to be connected in fluid flow relationship to a fluid flow line forming part of a sprinkler system;

a female connector having a coupling end with a receiving opening to receive the coupling end of the male connector therein and having a surface configured with at least one aligning portion to fully receive the coupling end of the male connector therein in a coupling condition only when the at least one aligning portion of the surface of the male coupling end aligns with and interengages the at least one aligning portion of the surface of the female receiving opening, and a threaded attachment end adapted to be connected in fluid flow relationship to a fluid flow line forming part of a sprinkler system;

a holding mechanism associated with and cooperable between the male connector and the female connector to secure the coupling end of the male connector in the receiving opening of the coupling end of the female connector when the coupling end of the male connector is inserted into and fully received in coupling condition in the receiving opening and to release the coupling end of the male connector from the receiving opening when desired to disconnect the male connector from the female connector;

the interengaging aligning surface portions on the male connector and the female connector cooperating to prevent relative rotation of the male connector and female connector when the connectors are in coupling condition, as the connectors are joined and moved into coupling condition, and as the connectors are released and separated from coupling condition;

a sprinkler head attached to one of the attachment ends; and a source of water attached to the other attachment end, whereby the sprinkler head can be easily disconnected from the source of water for replacement of the sprinkler head.

9. A quick connect and disconnect coupling according to claim 8, wherein the source of water is a base for mounting a sprinkler head.

10. A quick connect and disconnect coupling, comprising:
a male connector having a coupling end with a surface configured with at least one aligning portion thereof, and an attachment end;
a female connector having a coupling end with a receiving opening to receive the coupling end of the male connector therein and having a surface configured with at least one aligning portion to fully receive the coupling end of the male connector therein in a coupling condition only when the at least one aligning portion of the surface of the male coupling end aligns with and interengages the at least one aligning portion of the surface of the female receiving opening, and an attachment end;
at least one ball retaining hole through the coupling end of the female connector;
a ball in the at least one ball retaining hole;
a sleeve having a first inside diameter portion and a tapered portion tapering from the first diameter portion to a larger diameter portion and slidably mounted on the coupling end of the female connector over the at least one ball retaining hole so that the first diameter portion or the tapered portion may be selectively aligned with the at least one ball retaining hole, the first diameter portion when aligned with the at least one ball retaining hole holding the ball in the at least one ball retaining hole in an inward position wherein the ball extends into the receiving opening, and the tapered portion larger diameter portion when slid over the at least one ball retaining hole allowing the ball in the at least one ball retaining hole to move to an outward position out of the receiving opening;
a spring for biasing the sleeve to a biased position wherein the first diameter portion is aligned with the at least one ball retaining hole;
a ball receiving recess in the male connector for receiving the ball in the at least one ball retaining hole when the coupling end of the male connector is fully received in coupling condition in the receiving opening of the female connector and the ball in the at least one ball retaining hole is held in inward position to extend into the ball receiving recess to thereby securely hold the connectors together;

the interengaging aligning surface portions on the male connector and the female connector cooperating to prevent relative rotation of the male connector and female connector when the connectors are in coupling condition; and wherein the interengaging aligning surfaces include at least one flat formed on the male connector and at least one tab formed on the female connector which engages the at least one flat when the connectors are in coupled condition.

11. A quick connect and disconnect coupling according to claim 10, wherein the male connector has a length and the at least one flat is intermediate the length.

12. A quick connect and disconnect coupling according to claim 11, wherein the coupling end of the male connector joins the attachment end of the male connector intermediate the length of the male connector and the at least one flat is adjacent the joining of the coupling and attachment ends.

13. A quick connect and disconnect coupling according to claim 12, wherein the at least one flat is a pair of flats and the at least one tab is a pair of tabs.

14. A quick connect and disconnect coupling according to claim 10, wherein the ball receiving recess in the male connector coupling end is an annular groove.

15. A quick connect and disconnect coupling, comprising:
a male connector having a coupling end with a surface configured with at least one aligning portion thereof, and an attachment end adapted to be connected in fluid flow relationship to a fluid flow line;
a female connector having a coupling end with a receiving opening to receive the coupling end of the male connector therein and having a surface configured with at least one aligning portion to fully receive the coupling end of the male connector therein in a coupling condition only when the at least one aligning portion of the surface of the male coupling end aligns with and interengages the at least one aligning portion of the surface of the female receiving opening, and an attachment end adapted to be connected in fluid flow relationship to a fluid flow line;
holding means associated with and cooperable between the male connector and the female connector to secure the coupling end of the male connector in the receiving opening of the coupling end of the female connector when the coupling end of the male connector is inserted into and fully received in coupling condition in the receiving opening and to release the coupling end of the male connector from the receiving opening when desired to disconnect the male connector from the female connector;
the interengaging aligning surface portions on the male connector and the female connector cooperating to prevent relative rotation of the male connector and female connector when the connectors are in coupling condition, as the connectors are joined and moved into coupling condition, and as the connectors are released and separated from coupling condition;
wherein the interengaging aligning surfaces include at least one flat formed on one of the male and female connectors and at least one tab formed on the other of the male and female connectors which engages the at least one flat when the connectors are in coupled condition.

16. An irrigation sprinkler, comprising:
a base;
a connection adapted to connect to a source of water;

a water outlet;

a sprinkler head; and a quick connect and disconnect coupling, said coupling comprising:

a male connector having a coupling end with a surface configured with at least one aligning portion thereof, and an attachment end adapted to be connected in fluid flow relationship to a fluid flow line;

a female connector having a coupling end with a receiving opening to receive the coupling end of the male connector therein and having a surface configured with at least one aligning portion to fully receive the coupling end of the male connector therein in a coupling condition only when the at least one aligning portion of the surface of the male coupling end aligns with and interengages the at least one aligning portion of the surface of the female receiving opening, and an attachment end adapted to be connected in fluid flow relationship to a fluid flow line;

a holding mechanism associated with and cooperable between the male connector and the female connector to secure the coupling end of the male connector in the receiving opening of the coupling end of the female connector when the coupling end of the male connector is inserted into and fully received in coupling condition in the receiving opening and to release the coupling end of the male connector from the receiving opening when desired to disconnect the male connector from the female connector; and the interengaging aligning surface portions on the male connector and the female connector cooperating to prevent relative rotation of the male connector and female connector when the connectors are in coupling condition;

said coupling being positioned between the water outlet and the sprinkler head with the attachment end of one of the connectors attached to the water outlet and the attachment end of the other connector attached to the sprinkler head.

* * * * *